(12) United States Patent
Yoshino et al.

(10) Patent No.: US 11,987,040 B2
(45) Date of Patent: *May 21, 2024

(54) RELEASING MEMBER-INTEGRATED TRANSFER SHEET, METHOD FOR PRODUCING PRINT, METHOD FOR PRODUCING TRANSFER SHEET, AND PRINT SYSTEM

(71) Applicant: Dai Nippon Printing Co., Ltd., Tokyo (JP)

(72) Inventors: Shuhei Yoshino, Tokyo (JP); Shinya Yoda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 381 days.

This patent is subject to a terminal disclaimer.

(21) Appl. No.: 17/303,186

(22) Filed: May 24, 2021

(65) Prior Publication Data

US 2021/0276320 A1 Sep. 9, 2021

Related U.S. Application Data

(63) Continuation of application No. 16/485,213, filed as application No. PCT/JP2018/005504 on Feb. 16, 2018, now Pat. No. 11,040,526.

(30) Foreign Application Priority Data

Feb. 16, 2017 (JP) .................................. 2017-027306

(51) Int. Cl.
*B32B 7/06* (2019.01)
*B41J 2/005* (2006.01)
(Continued)

(52) U.S. Cl.
CPC ............... *B32B 7/06* (2013.01); *B41J 2/0057* (2013.01); *B41M 5/42* (2013.01); *C09J 7/40* (2018.01); *B41M 2205/10* (2013.01)

(58) Field of Classification Search
CPC .. B32B 7/06; B32B 7/02; B32B 27/00; B32B 7/12; B32B 27/08; B32B 27/32;
(Continued)

(56) References Cited

U.S. PATENT DOCUMENTS 5,310,589 A 5/1994 Nagashima
5,358,778 A 10/1994 Nagashima et al.
(Continued)

FOREIGN PATENT DOCUMENTS

EP 0 672 092 B1 2/1998
JP H04-223193 A1 8/1992
(Continued)

OTHER PUBLICATIONS

International Search Report and Written Opinion (Application No. PCT/JP2018/005504) dated Apr. 10, 2018.
(Continued)

*Primary Examiner* — Patricia L. Nordmeyer
(74) *Attorney, Agent, or Firm* — BURR PATENT LAW, PLLC

(57) ABSTRACT

Provided is a releasing member-integrated transfer sheet capable of improving both the conveyability on forming an image on a transfer layer and the transferability on transferring the transfer layer onto a transfer receiving article. A releasing member-integrated transfer sheet includes a releasing member including a first support and an adhesive layer provided on the first support, and a transfer sheet including a second support and a transfer layer provided on the second support, the transfer sheet being integrated with the releasing member such that the adhesive layer is opposed to the
(Continued)

second support. The transfer layer is peelable from the second support, and the adhesive force between the second support and the adhesive layer is smaller than the adhesive force between the first support and the adhesive layer to thereby make the releasing member separable from the transfer sheet.

5 Claims, 6 Drawing Sheets

(51) Int. Cl.
  *B41M 5/42* (2006.01)
  *C09J 7/40* (2018.01)
(58) Field of Classification Search
  CPC .......... B41J 2/0057; B41J 2/325; B41M 5/42; B41M 2205/10; B41M 2205/02; B41M 2205/06; B41M 5/41; B41M 5/382; B41M 5/44; B41M 5/50; B41M 5/52; C09J 7/40; B44C 1/17; B44C 1/1712
  See application file for complete search history.

(56) References Cited

U.S. PATENT DOCUMENTS

| | | | |
|---|---|---|---|
| 6,110,865 A | 8/2000 | Hayashi et al. | |
| 6,308,630 B1 | 10/2001 | Kurokawa et al. | |
| 6,616,993 B2 | 9/2003 | Usuki et al. | |
| 11,040,526 B2 * | 6/2021 | Yoshino | B41M 5/41 |
| 2007/0031617 A1 | 2/2007 | Field | |
| 2010/0304056 A1 | 12/2010 | Yasumatsu | |

FOREIGN PATENT DOCUMENTS

| | | |
|---|---|---|
| JP | H06-008653 A1 | 1/1994 |
| JP | H06-206389 A1 | 7/1994 |
| JP | H08-282197 A | 10/1996 |
| JP | H10-129133 A1 | 5/1998 |
| JP | H11-263079 A1 | 9/1999 |
| JP | 2000-103198 A1 | 4/2000 |
| JP | 2001-246845 A1 | 9/2001 |
| JP | 2002-160493 A1 | 6/2002 |
| JP | 2004-115563 A1 | 4/2004 |
| JP | 2009-297932 A1 | 12/2009 |
| JP | 2010-221475 A1 | 10/2010 |
| JP | 2010-274539 A1 | 12/2010 |
| JP | 2012-091344 A1 | 5/2012 |
| JP | 2013-199001 A1 | 10/2013 |
| JP | 2014-162040 A1 | 9/2014 |

OTHER PUBLICATIONS

Japanese Office Action (Application No. 2018-247939; Appeal No. 2019-8247) dated Feb. 25, 2020 (With English translation).

* cited by examiner

RELEASING MEMBER-INTEGRATED TRANSFER SHEET, METHOD FOR PRODUCING PRINT, METHOD FOR PRODUCING TRANSFER SHEET, AND PRINT SYSTEM

CROSS REFERENCE TO RELATED APPLICATIONS

This application is a continuation of U.S. application Ser. No. 16/485,213, filed Aug. 12, 2019, which in turn is the National Stage entry of International Application No. PCT/JP2018/005504, filed Feb. 16, 2018, which designated the United States, the entireties of which are incorporated herein by reference.

FIELD OF THE INVENTION

The present invention relates to a releasing member-integrated transfer sheet, a method for producing a print, a method for producing a transfer sheet, and a print system.

BACKGROUND OF THE INVENTION

There are known various forms of transfer sheets that have a transfer layer and can transfer the transfer layer onto a transfer receiving article. As proposed in Patent Literatures 1 and 2, known are, for example, (i) a transfer sheet in which a transfer layer of a single-layer structure or a layered structure including a receiving layer is provided on one side of a substrate (such a transfer sheet may be referred to as an intermediate transfer medium), and (ii) a transfer sheet in which a transfer layer of a single-layer structure or a layered structure including a protective layer (which may be referred to as a peeling layer) is provided on one side of a substrate (such a transfer sheet may be referred to as a protective layer transfer sheet).

A transfer sheet having such a transfer layer is combined with a thermal transfer sheet having a colorant layer. The colorant in the colorant layer is allowed to migrate by using an image formation method such as a sublimable type thermal transfer or a fusion type thermal transfer or inkjet ink is allowed to adhere onto the transfer layer by using an inkjet printing method, thereby forming an image on the transfer layer. Then, the transfer sheet having the transfer layer on which the image has been formed is combined with a transfer receiving article, and an appropriate transfer technique, for example, energy onto the transfer sheet is applied, thereby transferring the transfer layer on which the image has been formed onto the transfer receiving article to obtain a print.

Such a transfer sheet is required to have good image printability on forming an image on the transfer layer and good transferability on transferring the transfer layer on which the image has been formed onto a transfer receiving article. However, it is difficult to simultaneously satisfy both the image printability on forming an image on the transfer layer and the transferability on transferring the transfer layer onto a transfer receiving article, which are in the trade-off relationship.

CITATION LIST

Patent Literature

Patent Literature 1: Japanese Patent Laid-Open No. 11-263079
Patent Literature 2: Japanese Patent Laid-Open No. 2001-246845

SUMMARY OF THE INVENTION

Technical Problem

The present invention has been made in view of the above-mentioned circumstances, and the present invention aims principally to provide a releasing member-integrated transfer sheet that can improve both the image printability on forming an image on a transfer layer and the transferability on transferring the transfer layer onto a transfer receiving article, to provide a method for producing a print having good image printability on forming an image on a transfer layer and good transferability on transferring the transfer layer on which the image has been formed onto a transfer receiving article, to provide a method for producing a transfer sheet for use in the method for producing a print described above, and to provide a print system to be combined and used with the releasing member-integrated transfer sheet described above.

Solution to Problem

A releasing member-integrated transfer sheet according to an embodiment of the present disclosure for solving the above problems is a releasing member-integrated transfer sheet comprising a releasing member comprising a first support and an adhesive layer provided on the first support, and a transfer sheet comprising a second support and a transfer layer provided on the second support, the transfer sheet being integrated with the releasing member such that the adhesive layer is opposed to the second support, wherein the transfer layer is peelable from the second support, and the adhesive force between the second support and the adhesive layer is smaller than the adhesive force between the first support and the adhesive layer to thereby make the transfer sheet separable from the releasing member.

Another releasing member-integrated transfer sheet according to an embodiment of the present disclosure for solving the above problems comprises a releasing member comprising a first support and a melt-extruded resin layer provided on the first support, and a transfer sheet comprising a second support and a transfer layer provided on the second support, the transfer sheet being integrated with the releasing member such that the melt-extruded resin layer is opposed to the second support, wherein the transfer layer is peelable from the second support, and the adhesive force between the second support and the melt-extruded resin layer is smaller than the adhesive force between the first support and the melt-extruded resin layer to thereby make the transfer sheet separable from the releasing member.

The melt-extruded resin layer may contain a polyolefin resin.

The melt-extruded resin layer may have a thickness of 2.5 μm or more and 50 μm or less.

One or both of the stiffness of the releasing member-integrated transfer sheet in the machine direction (MD) and that in the traverse direction (TD) may be 5 mN or more and 25 mN or less as measured by the Gurley method in accordance with JIS-L-1085 (1998).

The transfer sheet constituting the releasing member-integrated transfer sheet may be an intermediate transfer medium comprising the second support and the transfer layer provided thereon, the transfer layer including the receiving layer, the receiving layer being located on the outermost surface.

A method for producing a print according to the present embodiment for solving the above problems comprises a step of forming an image on the transfer layer of the releasing member-integrated transfer sheet described above, a step of separating the transfer sheet including the transfer layer on which the image has been formed from the releasing member, a step of combining the transfer sheet separated from the releasing member with a transfer receiving article and transferring the transfer layer of the separated transfer sheet onto the transfer receiving article.

A method for producing a transfer sheet according to the present embodiment for solving the above problems comprises a step of forming an image on the transfer layer of the releasing member-integrated transfer sheet described above, and a step of separating the transfer sheet including the transfer layer on which the image has been formed from the releasing member.

The method may further comprise a step of winding the transfer sheet separated from the releasing member.

A print system according to the present embodiment for solving the above problems is a print system to be used in combination with the releasing member-integrated transfer sheet, the print system comprising an image formation device that forms an image on the transfer layer of the releasing member-integrated transfer sheet, a separation device that separates the transfer sheet from the releasing member, and a transfer device that transfers the transfer layer of the separated transfer sheet onto a transfer receiving article.

Another print system according to the present embodiment for solving the above problems is a print system to be used in combination with the releasing member-integrated transfer sheet, the print system comprising an image formation device that forms an image on the transfer layer of the releasing member-integrated transfer sheet, and a separation device that separates the transfer sheet from the releasing member.

The print system may also comprise a winding device that winds either one or both of the transfer sheet and the releasing member separated by the separation device.

Effect of the Invention

According to the releasing member-integrated transfer sheet of the present invention, both the image printability on forming an image on a transfer layer and the transferability on transferring the transfer layer onto a transfer receiving article can be improved. According to the method for producing a print, the image printability on forming an image on a transfer layer can be improved, and additionally the transferability on transferring the transfer layer on which the image has been formed onto a transfer receiving article can be improved. According to the method for producing a transfer sheet of the present invention, the image printability on forming an image on a transfer layer can be improved. By use of the transfer sheet obtained, the transferability on transferring the transfer layer on a transfer receiving article can also be improved. According to the print system of the present invention, an image can be formed on the transfer layer of a releasing member-integrated transfer sheet with a good image printability. The transfer layer on which the image has been formed can be transferred onto a transfer receiving article with a good transferability.

DETAILED DESCRIPTION OF THE INVENTION

Figure 1:
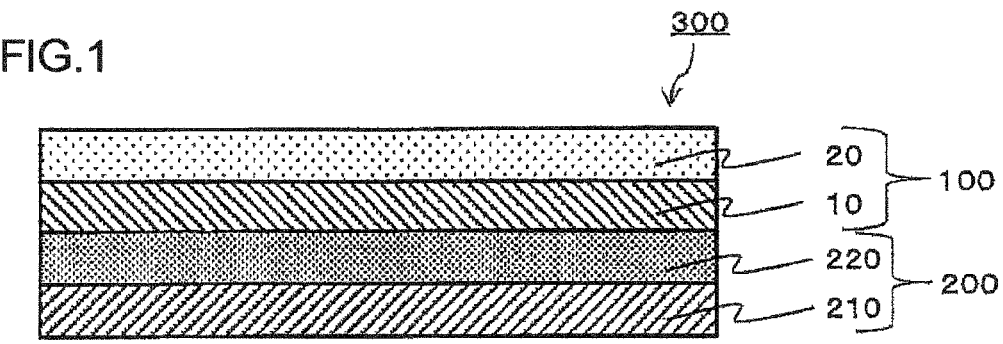
FIG. 1 is a schematic sectional view showing an example of a releasing member-integrated transfer sheet of one embodiment.

Hereinafter, embodiments of the present invention will be described with reference to the drawings and others. The present invention may be worked in various forms and should not be construed as being limited to the description of the exemplary embodiments below. In the drawings, components may be shown schematically regarding the width, thickness, and the like, compared to actual embodiments, for the sake of clearer illustration. The schematic drawings are merely illustrations and do not limit the interpretations of the present invention in any way. In the specification and the drawings, components that are described later and have substantially the same functions as those described before with reference to a previous drawing(s) bear the identical reference signs thereto, and detailed descriptions thereof may be omitted.

«Releasing Member-Integrated Transfer Sheet»

As shown in FIGS. 1 to 5, a releasing member-integrated transfer sheet 300 according to an embodiment of the present disclosure (hereinbelow, it may be referred to the releasing member-integrated transfer sheet of one embodiment) has a structure in which a releasing member 200 including a first support 210 and an adhesive layer 220 provided on the first support 210 is integrated with a transfer sheet 100 including a second support 10 and a transfer layer 20 provided on the second support 10 such that the adhesive layer 220 is opposed to the second support 10. A releasing member-integrated transfer sheet 300 according to another embodiment of the present disclosure has a structure in which a first support 210 and a transfer sheet 100 are attached to each other by a melt-extruded resin layer. The first support 210 and the melt-extruded resin layer constitute a releasing member 200. Hereinbelow, an example of the first support 210 and the transfer sheet 100 attached to each other by the adhesive layer 220 will be mainly described. The melt-extruded resin layer will be described later.

For describing advantages of the releasing member-integrated transfer sheet 300 of one embodiment constituting the above structure, a method for producing a print by use of a transfer sheet 100X not having the releasing member 200 (hereinbelow, the transfer sheet 100X may be referred to as the comparative transfer sheet) will be described as an example. FIG. 8 shows a process chart for illustrating a method for producing a print by use of the comparative transfer sheet 100X. The comparative transfer sheet 100X has a structure in which the transfer layer 20 is provided on one side of the support 10 (corresponding to the second support in the releasing member-integrated transfer sheet in one embodiment), and is identical to the releasing member-integrated transfer sheet 300 of one embodiment except that the releasing member 200 is not located on the other side of the support 10.

Figure 8A:
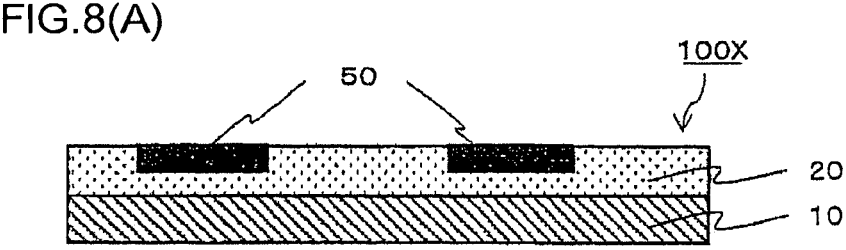
FIGS. 8(A) to (C) show a process chart showing an example of a method for producing a print by using a comparative transfer sheet.

The comparative transfer sheet 100X is set in a printer and conveyed along the conveyance path of the printer. On the transfer layer 20 of the comparative transfer sheet 100X to be conveyed along the conveyance path, an image 50 is formed by an image formation method possessed by the printer, as shown in FIG. 8(A). As the image formation method possessed by the printer, a sublimation type thermal transfer method by using a transfer sheet having a colorant layer, a fusion type thermal transfer method, and an inkjet printing method may be enumerated. The image printability on forming an image on the transfer layer 20 on the comparative transfer sheet 100X has a close relevance to the conveyability of the transfer sheet. Specifically, as the conveyability of the comparative transfer sheet 100X is lowered, printing wrinkles, printing unevenness, and the like are likely to occur in an image to be formed on the transfer layer 20. Accordingly, in order to improve the image printability on forming an image on the transfer layer 20 of the comparative transfer sheet 100X, it is necessary to improve the conveyability of the comparative transfer sheet 100X in the printer.

Examples of devices to improve the conveyability of the printer include (i) a device to increase the thickness of the entire comparative transfer sheet 100X to thereby improve the conveyability (synonymous with the conveying force) of the comparative transfer sheet 100X in the printer, (ii) a device to lower the conveyance speed for the comparative transfer sheet 100X in the printer, and (iii) a device to reduce the printing size of an image. Among these, increasing the thickness of the entire comparative transfer sheet 100X is desirable for improving the conveyability of the printer, in consideration of demands for acceleration of a printer and for a larger printing size. Specifically, increasing the thickness of the support 10 constituting the comparative transfer sheet 100X is desirable.

Figure 8B:
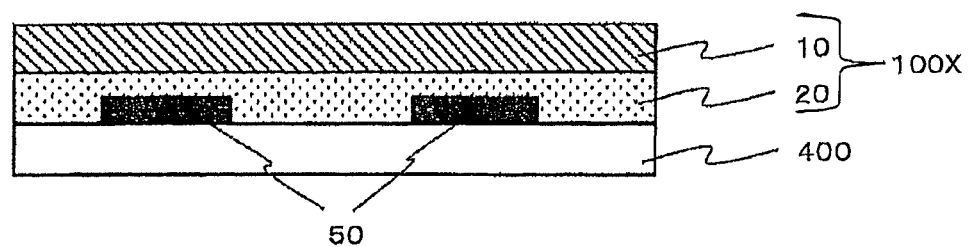
Figure 8C:
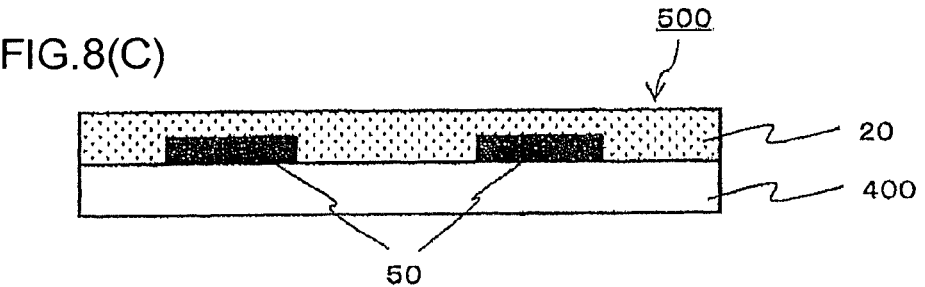

As shown in FIG. 8(B), the comparative transfer sheet 100X is subsequently superposed on a transfer receiving article 400 such that the transfer receiving article 400 is opposed to the transfer layer 20 of the comparative transfer sheet 100X to thereby transfer the transfer layer 20 of the comparative transfer sheet 100X onto the transfer receiving article 400. Thus, a print 500 obtained by transferring the transfer layer 20 on which the image 50 has been formed is provided onto the transfer receiving article 400, as shown in FIG. 8(C).

It is necessary to improve the transferability of the transfer layer 20 in order to prevent occurrence of a transfer failure, for example, occurrence of a remaining portion of the transfer layer 20, which otherwise should be transferred onto the transfer receiving article 400, on the side of the support 10 of the comparative transfer sheet 100X when the transfer layer 20 of the comparative transfer sheet 100X is transferred onto the transfer receiving article 400. Generally, the transferability of the transfer layer 20 is influenced by the thickness of the constituent members other than the transfer layer 20. In the case where transfer is carried out using any of various transfer devices to be mentioned below, it is desirable to reduce the thickness of the support 10, which is a constituent member other than the transfer layer 20.

In the case where a thermal transfer method involving an application of energy to the support 10 to transfer the transfer layer 20 is used for the transfer device, it is desirable to reduce the thickness of the support 10 in order to enhance the transfer efficiency of the energy. This is due to the following reason: the transferability of the transfer layer 20 depends on the energy to be transferred to the transfer layer 20; in the case where the thickness of the support 10 is increased, the energy to be transferred to the transfer layer 20 is lowered; and thus a transfer failure of occurrence of a remaining portion of the transfer layer 20 on the side of the support 10 of the transfer sheet 100X is likely to occur.

In the case of transferring the transfer layer 20 using a device other than the thermal transfer method, for example, in the case of transferring the transfer layer 20 by pressing or the like, reducing the thickness of the support 10 enables the transfer layer 20 to be transferred with good conformability to the pressing.

In summary, in order to improve the image printability on forming an image on the transfer layer 20 in the comparative transfer sheet 100X, it is desirable to increase the thickness of the support 10. Specifically, in order to satisfy demands for acceleration of a printer and for a larger printing size while preventing printing wrinkles, printing unevenness, and the like that may occur on forming an image on the transfer layer 20, it is desirable to increase the thickness of the support 10.

In contrast, it is desirable to reduce the thickness of the support 10 in order to improve the transferability on transferring the transfer layer 20 on a transfer receiving article 400. In other words, it can be said that the image printability on forming an image on the transfer layer 20 and the transferability on transferring the transfer layer 20 on a transfer receiving article are in a trade-off relationship in the comparative transfer sheet 100X. Accordingly, for the comparative transfer sheet 100X in which the thickness of the support 10 is not variable, in other words, the thickness of the support 10 is uniquely determined, it can be said that it is difficult to achieve both the image printability on forming an image on the transfer layer 20 and the transferability on transferring the transfer layer 20 on a transfer receiving article.

The releasing member-integrated transfer sheet 300 of one embodiment, which is in consideration of such circumstances, has a structure in which a releasing member 200 including a first support 210 and an adhesive layer 220 provided on the first support 210 is integrated with a transfer sheet 100 including a second support 10 and a transfer layer 20 provided on the second support 10 such that the adhesive layer 220 is opposed to the second support 10, and the transfer layer 20 is peelable from the second support 10. The adhesive force (it may be referred to as the adhesion force) between the second support 10 and the adhesive layer 220 is smaller than the adhesive force between the first support 210 and the adhesive layer 220 to thereby make the transfer sheet 100 separable from the releasing member 200.

According to the releasing member-integrated transfer sheet 300 of one embodiment having these features, it is possible to apparently change the thickness of the support 10 of the comparative transfer sheet 100X described above. Specifically, it is possible to improve the conveyability in a printer by allowing the transfer sheet 100 and the releasing member 200 to be in an integrated state in the step of forming an image on the transfer layer 20. As a result, it is possible to prevent occurrence of printing wrinkles and printing unevenness on forming an image on the transfer layer 20 and to improve the image printability on forming an image on the transfer layer 20. Thus, according to the releasing member-integrated transfer sheet 300 of one embodiment, the releasing member 200 enables the bulk increase of the thickness of the entire transfer sheet, in other words, can apparently increase the thickness of the support 10 in the comparative transfer sheet 100X, and appropriately setting the thickness of the releasing member can improve the conveyability in the printer.

Further, the releasing member-integrated transfer sheet 300 of one embodiment makes the transfer sheet 100 separable from the releasing member 200 by allowing the adhesive force between the second support 10 and the adhesive layer 220 to be smaller than the adhesive force between the first support 210 and the adhesive layer 220. According to this configuration, after an image is formed on the transfer layer 20, separation of the transfer sheet 100 including the transfer layer 20 on which the image has been formed from the releasing member 200 can make the thickness of the constituent member(s) located on the second support 10 side of the transfer layer 20 smaller than the thickness before the releasing member 200 is separated.

Figure 6A:
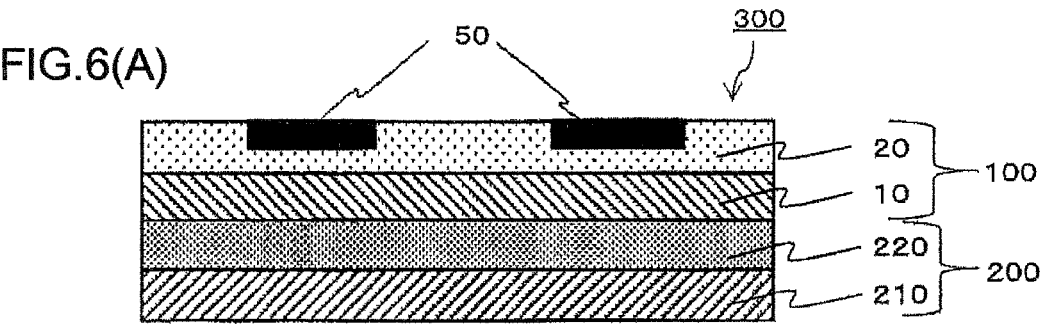
FIGS. 6(A) to 6(D) show a process chart showing an example of a method for producing a print of one embodiment.

Specifically, before the releasing member 200 is separated, the second support 10, the adhesive layer 220, and the first support 210 are located on the second support 10 side of the transfer layer 20 (see FIG. 6(A)). Thus, the thickness of the constituent members located on the second support 10 side of the transfer layer 20 is the total thickness of the second support 10, the adhesive layer 220, and the first support 210. In contrast, after the releasing member 200 is separated, only the second support 10 is located on the second support 10 side of the transfer layer 20 (see FIG. 6(B)). Thus, separation of the transfer sheet 100 from the releasing member 200 can make the thickness of the constituent member(s) located on the second support 10 side of the transfer layer 20 smaller than the thickness before the separation. That is, it is possible to apparently make the thickness of the support 10 in the comparative transfer sheet 100X smaller.

According to the releasing member-integrated transfer sheet having these features of one embodiment, the transferability on transferring the transfer layer 20 onto the transfer receiving article 400 can be improved. For example, in the case where the transfer layer is transferred by application of energy, reducing the thickness of the constituent member(s) other than the transfer layer 20 enables efficient transfer of energy from the side of the second support to the transfer layer 20 and, as a result, the transferability of the transfer layer 20 can be improved.

In other words, it can be said that the releasing member-integrated transfer sheet 300 of one embodiment is a transfer sheet of a novel structure, which makes the total thickness apparently variable, in comparison with the structure of the conventional transfer sheets. Thus, the releasing member-integrated transfer sheet of one embodiment can provide improvement in both the image printability on forming an image on the transfer layer 20 and the transferability on transferring the transfer layer 20, which are in the trade-off relationship.

Hereinbelow, the constituents of the releasing member-integrated transfer sheet 300 of one embodiment will be described with reference to examples.

<Releasing Member>

As shown in FIGS. 1 to 5, a releasing member 200 constituting the releasing member-integrated transfer sheet 300 of one embodiment has a layered structure in which a first support 210 and an adhesive layer 220 are layered. As described above, on forming an image on the transfer layer 20 by use of the releasing member-integrated transfer sheet 300 of one embodiment, the releasing member 200 serves to improve the conveyability in a printer as well as serves to make the total thickness variable by being separable from the transfer sheet 100. That is, the releasing member 200 serves to improve the image printability on forming an image on the transfer layer 20.

(First Support)

The first support 210, which is an essential constituent in the releasing member-integrated transfer sheet 300 of one embodiment, constitutes the releasing member 200. The first support 210 may consist of a single constituent member (e.g., consist only of a substrate) or may be made by laminating a plurality of constituent members. As the constituent members constituting the first support 210, various plastic films or sheets of: polyesters such as polyethylene terephthalate, polyarylate, polycarbonate, polyurethane, polyimide, polyetherimide, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyetheretherketone, polysulfone, polyethersulfone, tetrafluoroethylene-perfluoroalkyl vinyl ether copolymers, polyvinyl fluorides, tetrafluoroethylene-ethylene copolymers, tetrafluoroethylene-hexafluoropropylene copolymers, polychlorotrifluoroethylene, polyvinylidene fluoride, and the like may be enumerated.

As mentioned below, for making the adhesive force between the second support 10 and the adhesive layer 220 smaller than the adhesive force between the first support 210 and the adhesive layer 220, the surface of the first support 210 on the side to be in contact with the adhesive layer 220 can be subjected to a treatment to enhance the adhesive force to the adhesive layer 220. This also applies to the case where the adhesive layer 220 is replaced by a melt-extruded resin layer described below.

As the treatment to enhance the adhesive force, corona discharge treatment, flame treatment, ozone treatment, ultraviolet treatment, radiation treatment, roughening treatment, chemical treatment, plasma treatment, low temperature plasma treatment, primer treatment, grafting treatment, and the like may be enumerated. The primer treatment referred to herein also includes making a structure in which a primer layer is provided on the constituent member constituting the first support (e.g., the substrate). The primer layer in this case constitutes the first support.

There is no particular limitation on the thickness of the first support 210, and the thickness can be appropriately set in consideration of the thickness of the adhesive layer 220, the thickness of the releasing member 200, the thickness of the transfer sheet 100 to be integrated with the releasing member 200, the thickness of the releasing member-integrated transfer sheet 300, and the like. In consideration of the conveyability in a printer, in other words, in consideration of the image printability on forming an image on the transfer layer 20, the thickness of the releasing member-integrated transfer sheet 300 is preferably 50 μm or more and 1500 μm or less, more preferably 100 μm or more and 300 μm or less, particularly preferably 150 μm or more and 250 μm or less. Thus, the thickness of the first support 210 is preferably set, in consideration of the thickness of the transfer sheet 100 and the like, such that the thickness of the releasing member-integrated transfer sheet 300 will be a preferable thickness described above. The same applies to the thickness of the releasing member 200 and of the adhesive layer 220.

(Adhesive Layer)

The adhesive layer 220 is provided on the first support 210. The adhesive layer 220, which is an essential constituent in the releasing member-integrated transfer sheet 300 of one embodiment, constitutes the releasing member 200.

Materials of the adhesive layer 220 is not particularly limited, and conventionally known materials mainly based on an acrylic resin, vinyl resin, polyester resin, urethane resin, polyamide resin, epoxy resin, rubber resin, ionomer resin, silicone resin, and the like may be enumerated. Materials other than these can be used. The adhesive layer 220 may be constituted by a single material or may be constituted by two or more materials. There is not particular limitation on the thickness of the adhesive layer 220. The thickness is preferably 0.1 μm or more and 50 μm or less, more preferably 1 μm or more and 20 μm or less.

There is no particular limitation on the method of forming the adhesive layer 220. The adhesive layer 220 may be formed by dispersing or dissolving any of the components exemplified above and others into a suitable solvent to prepare a coating liquid for adhesive layer, applying this coating liquid to the first support 210 or the second support 10, and then drying the coated liquid. There is no particular limitation on the method for applying the coating liquid for adhesive layer, and any conventionally known coating method can be selected appropriately and used herein. As the coating method, for example, the gravure printing method, the screen printing method, the reverse roll coating method using a gravure plate, and the like may be enumerated. Coating methods other than these methods may be also used.

Alternatively, as the adhesive layer 220, the surface of a support for adhesive layer to which adhesiveness has been imparted may be used as the adhesive layer 220.

(Melt-Extruded Resin Layer)

In the above, the releasing member 200 is constituted by the first support 210 and the adhesive layer 220. In consideration of the winding property of the releasing member 200 separated after the releasing member-integrated transfer sheet 300 of one embodiment is separated into the releasing member 200 and the transfer sheet 100, however, the surface of the releasing member 200 after the separation preferably has no adhesiveness.

Then, in a releasing member-integrated transfer sheet 300 according to another embodiment, a releasing member 200 is constituted by a first support 210 and a melt-extruded resin layer. According to the releasing member-integrated transfer sheet 300 in accordance with another embodiment, it is possible to lower the adhesiveness of the surface of the releasing member 200 after the separation, compared to the releasing member 200 having the adhesive layer 220 formed by applying and drying the coating liquid for adhesive layer described above. Therefore, according to the releasing member-integrated transfer sheet 300 in accordance with another embodiment, the releasing member 200 after the separation can be wound without winding misalignment and the like.

That is, the winding suitability of the releasing member 200 separated can be improved. Additionally, the separability between the releasing member 200 and the transfer sheet 100 can be improved.

The releasing member 200 of the releasing member-integrated transfer sheet in accordance with another embodiment is different from the releasing member-integrated transfer sheet 300 of the above one embodiment only in that the adhesive layer 220 of the latter is replaced by a melt-extruded resin layer, and the other respects are identical. Accordingly, when the adhesive layer 220 is replaced by a melt-extruded resin layer, the reference to the adhesive layer 220 herein may be appropriately read as a melt-extruded resin layer. Additionally, the releasing member-integrated transfer sheet of one embodiment may be appropriately read as the releasing member-integrated transfer sheet in accordance with another embodiment.

The melt-extruded resin layer referred to herein means a resin layer obtained by extruding a melted resin into a film form with an extruder such as a T die, and can be formed by a conventionally known extrusion method referred to as an extrusion coating lamination method, sand lamination method, tandem lamination method, or the like.

The preferable melt-extruded resin layer contains a polyolefin resin. The melt-extruded resin layer containing a polyolefin resin can further improve the winding suitability and separability. The melt-extruded resin may contain one polyolefin resin or may contain two or more polyolefin resins.

As the polyolefin resins, polyester resins such as polyethylene, polyethylene terephthalate, and polyethylene naphthalate, polypropylene resins, polybutene resins, polyisobutene resins, polybutadiene resins, polyisoprene resins, ethylene-vinyl acetate copolymers, and the like may be enumerated.

The melting point of the above polyethylene resins as measured in accordance with JIS-K-7121 is preferably 100° C. or more and 170° C. or less. The density of the above polyethylene resins as measured in accordance with JIS-K-6760 is preferably 0.89 g/cm$^3$ or more and 0.97 g/cm$^3$ or less, more preferably 0.91 g/cm$^3$ or more and 0.93 g/cm$^3$ or less. Further preferable are polyethylene resins having a melting point and a density that each satisfy the above preferable range. The melt-extruded resin layer may contain one polyethylene resin having a melting point and a density that each satisfy the preferable range or may contain two or more such polyethylene resins.

The thickness of the melt-extruded resin layer is preferably 2.5 μm or more and 50 μm or less, more preferably 8 μm or more and 25 μm or less. When the melt-extruded resin layer has a preferable thickness as described above, the adhesion between the releasing member 200 and the transfer sheet 100 can be improved, and also the winding property of the releasing member 200 can be further improved while curling of the releasing member 200 is sufficiently suppressed.

<Transfer Sheet>

As shown in FIGS. 1 to 5, the transfer sheet 100 constituting the releasing member-integrated transfer sheet 300 of one embodiment has a layered structure in which the second support 10 and the transfer layer 20 are layered. Also as shown in FIGS. 1 to 5, the releasing member 200 is integrated with the transfer sheet 100 such that the adhesive layer 220 in the releasing member 200 is opposed to the second support 10 in the transfer sheet 100. A releasing member-integrated transfer sheet 300 according to another embodiment of the present disclosure has a structure in which a first support 210 and a transfer sheet 100 are attached to each other by means of a melt-extruded resin layer constituting the releasing member 200. Hereinbelow, an example of the first support and the second support attached to each other by means of the adhesive layer 220 will be mainly described.

(Second Support)

The second support 10, which is an essential constituent in the releasing member-integrated transfer sheet 300 of one embodiment, constitutes the transfer sheet 100. There is no particular limitation also on the second support. One of features of the releasing member-integrated transfer sheet 300 of one embodiment is that the adhesive force between the second support 10 and the adhesive layer 220 is smaller than the adhesive force between the first support 210 and the adhesive layer 220. This feature enables the transfer sheet 100 and the releasing member 200 to be separated. In other words, separation of the releasing member-integrated transfer sheet 300 of one embodiment is performed at the interface between the adhesive layer 220 and the second support 10.

The second support may consist of a single constituent member or may be made by laminating a plurality of constituent members. As the constituent members constituting the second support, the constituent members described in the above first support 210 can be selected appropriately and used. As the constituent members constituting the second support 10, those satisfying a relationship in which the adhesive force with the adhesive layer 220 is smaller than the adhesive force between the first support and the adhesive layer 220 may be appropriately used. The first support 210 and the second support 10 may be identical constituent members. In this case, in order to satisfy the relationship in which the adhesive force between the second support 10 and the adhesive layer 220 is smaller than the adhesive force between the first support 210 and the adhesive layer 220, a device that enhances the adhesive force between the first support 210 and the adhesive layer 220 or a device that lowers the adhesive force between the second support 10 and the adhesive layer 220 may be appropriately used.

Figure 2:
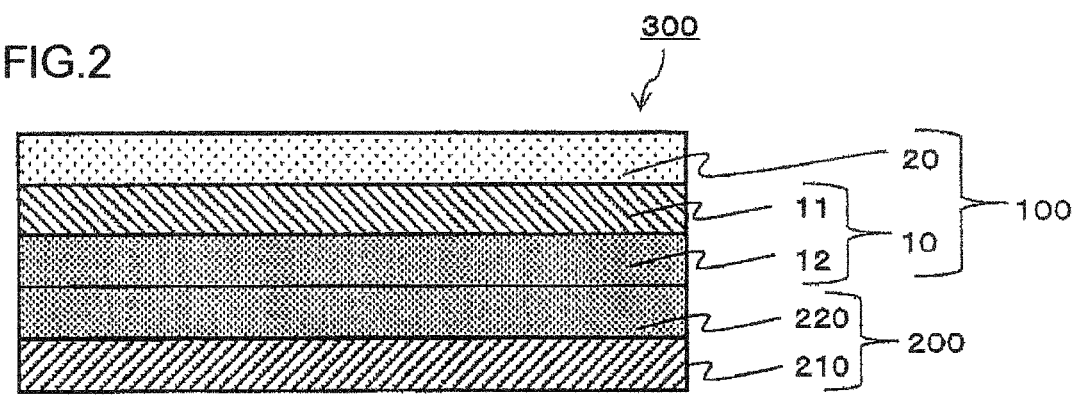
FIG. 2 is a schematic sectional view showing another example of the releasing member-integrated transfer sheet of one embodiment.

As the former device, treatments to enhance the adhesive force described above may be enumerated, and as the latter device, devices to provide a release layer 12 and the like on the surface on the side opposed to the adhesive layer 220 in a substrate 11 as a constituent member constituting the second support, as shown in FIG. 2, may be enumerated. These devices are applicable to a case in which the constituent member constituting the first support 210 is different from the constituent member constituting the second support 10. In the case where a release layer is provided on the surface on the side in contact with the adhesive layer 220 of the constituent member constituting the second support 10, the release layer will be a layer constituting the second support 10. Specifically, on the surface on the opposite side to the surface having the first support 210 provided thereon of the adhesive layer 220, the layer in direct contact with adhesive layer 220 will be a layer constituting the second support 10.

There is no particular limitation on the thickness of the second support 10 (in the case where the second support is constituted by a plurality of constituent members, the total thickness thereof), but the thickness is preferably 180 μm or less, more preferably 150 μm or less, particularly preferably 75 μm or less. When the second support 10 has a preferable thickness as described above, the transferability of the transfer layer on transferring the transfer layer 20 can be further improved. The thickness of the second support 10 is preferably 5 μm or more, more preferably 20 μm or more. In the case of transferring the transfer layer by the thermal transfer method, for example, the transfer layer 20 efficiently transfers energy when the second support 10 has a preferable thickness as described above. Alternatively, in the case of transferring the transfer layer by pressing, the conformability of the transfer layer 20 to the pressing can be further improved. That is, the transferability of the transfer layer 20 can be further improved.

Additionally, the heat resistance of the second support 10 can be improved and transfer wrinkles and transfer unevenness caused by insufficient heat resistance of the second support 10 can be more effectively prevented on transferring the transfer layer 20.

The adhesive force between the second support 10 and the adhesive layer 220 is preferably 10 mN/cm or more and 8000 mN/cm or less, more preferably 10 mN/cm or more and 3000 mN/cm or less. The transfer sheet 100 can be easily separated from the releasing member 200 when the adhesive force between the second support 10 and the adhesive layer 220 is a preferable adhesive force as described above.

Figure 7:
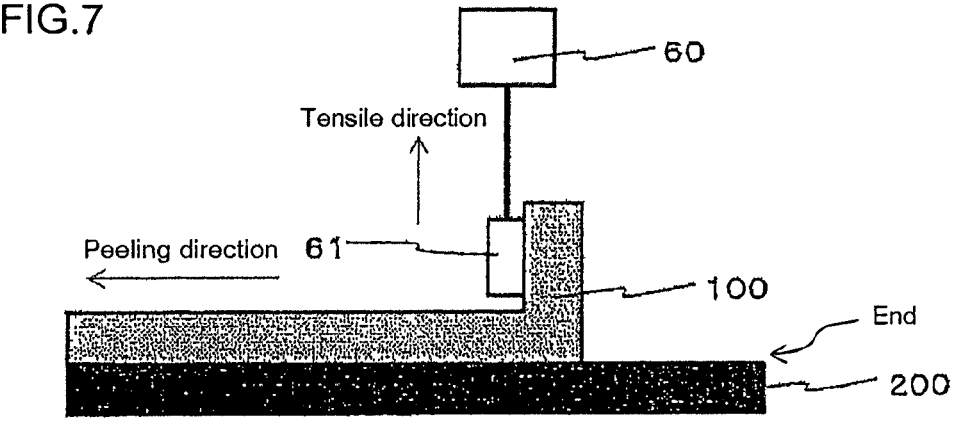
FIG. 7 is a schematic view for illustrating a method for measuring an adhesive force.

The adhesive force between the second support 10 and the adhesive layer 220 referred to herein is an adhesive force as measured by the method shown in FIG. 7. Specifically, the transfer sheet of the releasing member-integrated transfer sheet 300 is peeled from the releasing member 200 at an end of the transfer sheet to a point 5 mm distant therefrom. The peeled transfer sheet is bent at an angle of 90° to the surface of the transfer sheet (the surface of the releasing member). Subsequently, a fixing jig 61 is attached to the bent transfer sheet 100, and this fixing jig 61 is pulled in the direction of 90° relative to the surface of the transfer sheet (relative to the surface of the releasing member) (the tension direction in the figure) to peel the transfer layer on the unpeeled portion at the end of the transfer sheet to a point 15 mm distant therefrom (measurement range: starting at the point 5 mm distant from the end of the transfer sheet, up to 10 mm) toward the peeling direction. Meanwhile, the tension when the transfer sheet 100 integrated with the releasing member 200 is peeled from the releasing member 200 in the measurement range is measured using the measurement apparatus 60 attached to the fixing member 51. The maximum value among tensions measured is used as the adhesive force between the second support 10 and the adhesive layer 220. As the measurement apparatus, a DIGITAL FORCE GAUGE DS-20N (IMADA CO., LTD.) is employed.

(Transfer Layer)

As shown in FIGS. 1 to 5, the transfer layer 20 is provided on the second support 10. The transfer layer 20, which is an essential constituent in the releasing member-integrated transfer sheet 300 of one embodiment, constitutes the transfer sheet 100. The transfer layer 20 is a layer peelable from the second support 10 by various transfer devices, such as application of energy. The adhesive force between the second support 10 and the transfer layer 20 is preferably larger than the adhesive force between the second support 10 and the adhesive layer 220. This is for preventing unintended peeling between the second support 10 and the transfer layer 20 when the transfer sheet 100 is separated from the releasing member 200.

Figure 3:
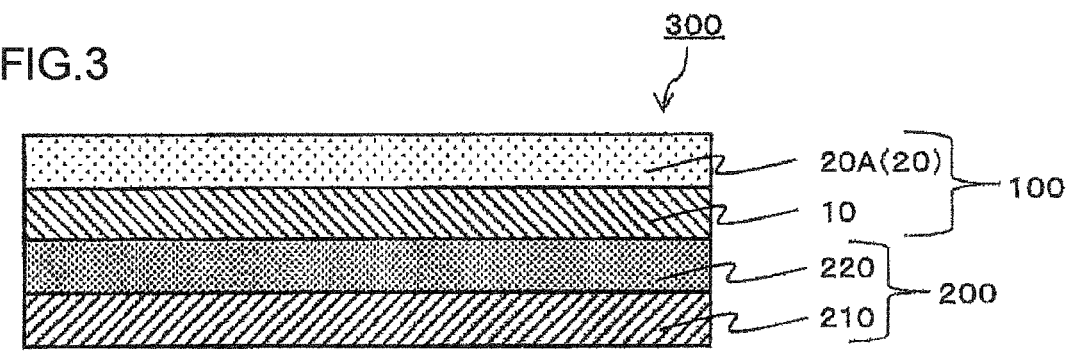
FIG. 3 is a schematic sectional view showing yet another example of the releasing member-integrated transfer sheet of one embodiment.

On forming a print by use of the releasing member-integrated transfer sheet 300 of one embodiment, an image 50 is formed on the transfer layer 20 (see FIG. 6(A)). The image 50 to be formed on the transfer layer 20 depends on the image formation method possessed by a printer. For example, a transfer sheet having a colorant layer and the releasing member-integrated transfer sheet 300 of one embodiment are set in a printer, and the image 50 is formed on the transfer layer 20 while the releasing member-integrated transfer sheet is conveyed along the conveyance path. In this case, when the transfer sheet used in combination with the releasing member-integrated transfer sheet 300 of one embodiment is a transfer sheet having a sublimable dye layer as the colorant layer, a transfer layer 20 including a receiving layer 20A that can receive a sublimable dye may be used as the transfer layer 20, as shown in FIG. 3. The same applies to the case where an image is formed on the transfer layer 20 of the releasing member-integrated transfer sheet 300 of one embodiment by the inkjet printing method.

Figure 4:
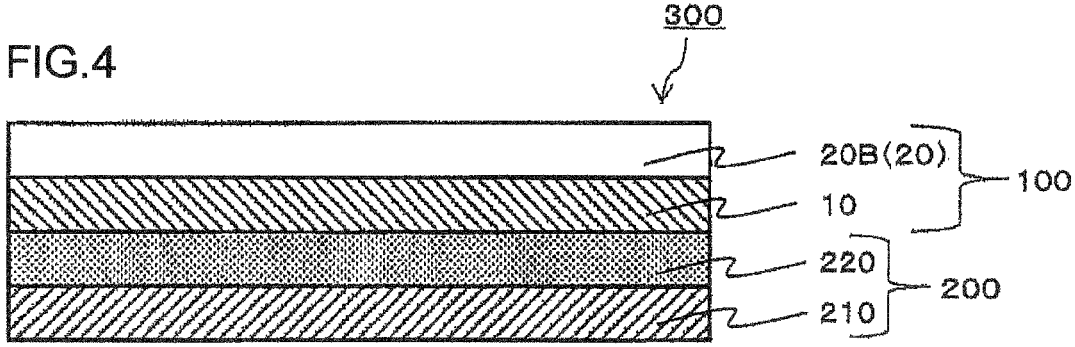
FIG. 4 is a schematic sectional view showing still another example of the releasing member-integrated transfer sheet of one embodiment.

In contrast, in the case where the transfer sheet used in combination with the releasing member-integrated transfer sheet 300 of one embodiment is a transfer sheet having a fusible ink layer as the colorant layer, a transfer layer 20 including, in addition to the above receiving layer 20A, a peeling layer 20B (it may be referred to as a protective layer), as shown in FIG. 4, also may be used as the transfer layer 20. Hereinbelow, examples of the transfer layer 20 will be described by using FIGS. 3 to 5.

(Transfer Layer of First Embodiment)

As shown in FIG. 3, a transfer layer 20 of a first embodiment as an example has a single-layer structure consisting only of a receiving layer 20A. As the material of the receiving layer 20A, polyolefin resins such as polypropylene, halogenated resins such as polyvinyl chloride and polyvinylidene chloride, vinyl resins such as polyvinyl acetate, vinyl chloride-vinyl acetate copolymers, ethylene-vinyl acetate copolymers, and polyacrylic esters, polyester resins such as polyethylene terephthalate and polybutylene terephthalate, polystyrene resins, polyamide resins, copolymers of an olefin such as ethylene or propylene and another vinyl polymer, ionomers or cellulose-based resins such as cellulose diastase, polycarbonate, and solvent type resin such as acrylic resins may be enumerated. One of these materials may be used singly, or two or more of these may be used in combination. There is not particular limitation on the thickness of the receiving layer 20A. The thickness is preferably 0.5 μm or more and 10 μm or less, more preferably 2 μm or more and 5 μm or less.

In the case where the transfer layer 20 have a single-layer structure constituted only by the receiving layer 20A, the receiving layer 20A preferably contains a material that enhances the peelable property in order to enhance the peelable property of the transfer layer 20 from the second support 10 when energy is applied. Materials that enhance the peelable property include waxes such as polyethylene wax and silicone wax, silicone resins, modified silicone resins, fluorine resins, modified fluorine resins, polyvinyl alcohol, acryl resins, thermosetting epoxy-amino copolymers, thermosetting alkyd-amino copolymers (thermosetting aminoalkyd resins), and the like may be enumerated.

Alternatively or in addition to containing a component to enhance the peelable property described above, a second support 10 (not shown) in which the substrate and the release layer are layered in this order from the side of the releasing member 200 can be used as the second support 10 to enhance the peelable property of the receiving layer 20A.

The receiving layer 20A may also contain a material that enhances the adhesion to a transfer receiving article. As materials that enhances the adhesion to a transfer receiving article, acrylic resins, vinyl resins, polyester resins, urethane resins, polyamide resins, epoxy resins, rubber resins, ionomer resins, and the like may be enumerated. When measures to enhance the adhesion to the transfer layer have been taken on the side of the transfer receiving article, it is not particularly necessary to conduct such a treatment.

The transfer layer 20 of the first embodiment described above is a preferable embodiment in the case where the releasing member-integrated transfer sheet 300 of one embodiment is combined with a transfer sheet having a colorant layer containing a sublimable dye to form an image on the transfer layer 20 or in the case where the inkjet printing method is used to form an image on the transfer layer 20.

(Transfer Layer of Second Embodiment)

As shown in FIG. 4, a transfer layer 20 of a second embodiment as an example has a single layer structure consisting only of a peeling layer 20B (it may be referred to as a protective layer).

As materials of the peeling layer 20B, ethylene-vinyl acetate copolymers, vinyl chloride-vinyl acetate copolymers, maleic acid-modified vinyl chloride-vinyl acetate copolymers, polyamide resins, polyester resins, polyethylene resins, ethylene-isobutyl acrylate copolymers, butyral resins, polyvinyl acetate and copolymers thereof, ionomer resins, acid-modified polyolefin resins, (meth)acrylic resins such as acrylic and methacrylic, acryl acid ester resins, ethylene-(meth)acrylic acid copolymers, ethylene-(meth) acrylic acid ester copolymers, polymethyl methacrylate resins, cellulosic resins, polyvinyl ether resins, polyurethane resins, polycarbonate resins, polypropylene resins, epoxy resins, phenol resins, vinyl resins, maleic acid resins, alkyd resins, polyethylene oxide resins, urea resins, melamine resins, melamine-alkyd resins, silicone resins, rubber resins, styrene-butadiene-styrene block copolymers (SBS), styrene-isoprene-styrene block copolymers (SIS), styrene-ethylene-butylene-styrene block copolymers (SEBS), styrene-ethylene-propylene-styrene block copolymers (SEPS), and the like may be enumerated. One of these materials may be used singly, or two or more of these may be used in combination.

There is no particular limitation on the thickness of the peeling layer 20B. The thickness is preferably 1 μm or more and 15 μm or less.

(Transfer Layer of Third Embodiment)

Figure 5:
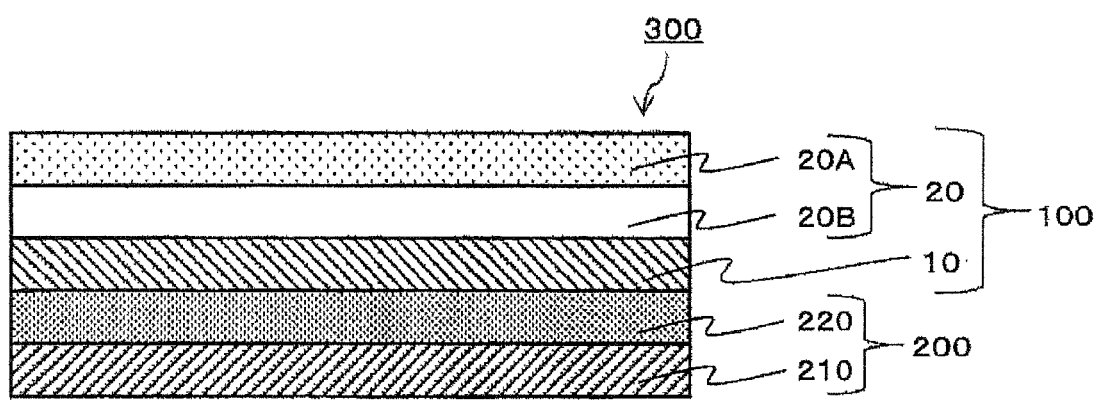
FIG. 5 is a schematic sectional view showing still another example of the releasing member-integrated transfer sheet of one embodiment.

As shown in FIG. 5, a transfer layer 20 of a third embodiment as an example has a layered structure in which a peeling layer 20B and a receiving layer 20A are layered in this order from the side of a second support 10.

As the peeling layer 20B and receiving layer 20A in the transfer layer of the third embodiment, the receiving layer 20A and peeling layer 20B described in the transfer layers of the above first and second embodiments may be appropriately selected and used. According to the transfer layer of the third embodiment, even in the case where the receiving layer contains no material that enhances the peelable property, the presence of the peeling layer 20B can improve the peelable property of the transfer layer 20.

The transfer layer 20 is not limited to the embodiments described above, and may be in various forms other than these. For example, alternatively or in addition to the receiving layer 20A and peeling layer 20B described above, conventionally known antistatic layers, plasticizer resistance layers, and the like may be used to constitute the transfer layer 20.

In the transfer layer 20 of the first embodiment or third embodiment described above, a receiving layer 20A is located on the outermost surface, and an image is formed on the receiving layer 20A by a sublimation type thermal transfer method. In the sublimation type thermal transfer method, higher energy is applied to the transfer sheet on formation of an image than in other image formation methods, and due to this higher energy, printing wrinkles and printing unevenness tend to occur on the image to be formed. That is, the image printability on forming an image on the transfer layer 20 tends to be lowered. However, with the releasing member-integrated transfer sheet 300 of one embodiment, the presence of the releasing member 200 can enhance the conveyability in a printer and can prevent printing wrinkles and printing unevenness caused by the low conveyability of the printer. That is, the image printability on forming an image on the transfer layer 20 can be improved. Accordingly, the releasing member-integrated transfer sheet 300 of one embodiment comprising the transfer layer 20 of the first embodiment or third embodiment described above is suitable in the case where an image is formed by the sublimation type thermal transfer method.

(Stiffness)

One or both of the stiffness of the releasing member-integrated transfer sheet 300 of one embodiment in the MD and that in the TD, as measured by the Gurley method in accordance with JIS-L-1085 (1998), is preferably 2 mN or more and 30 mN or less, more preferably 5 mN or more and 25 mN or less. According to the releasing member-integrated transfer sheet 300 of one embodiment having one or both of the above-described preferable stiffness in the MD and that in the TD, occurrence of printing unevenness and printing wrinkles can be effectively prevented when the image 50 is formed on the transfer layer 20 by using a printer equipped with a platen roller, a thermal head, and the like. In a releasing member-integrated transfer sheet 300 of a more preferable embodiment, the stiffness at least in the MD is the preferable stiffness described above. The MD referred to herein is the abbreviation of the Machine Direction, and the TD is the abbreviation of the Transverse Direction. The MD referred to herein means the flow direction of the releasing member-integrated transfer sheet 300 in the printer, and the TD means the direction orthogonal to the MD.

«Transfer Receiving Article»

There is no particular limitation on a transfer receiving article 400 onto which the transfer layer 20 of the releasing member-integrated transfer sheet 300 of various embodiments described above is transferred, and plain paper, wood-free paper, tracing paper, plastic films, plastic cards formed mainly of vinyl chloride, vinyl chloride-vinyl acetate copolymers, or polycarbonate, thermal transfer image-receiving sheets, and prints obtained by transferring the transfer layer of an intermediate transfer medium on an arbitrary object, and the like may be enumerated. An article on which a predetermined image is formed in advance may also be used as the transfer receiving article 400.

«Method for Producing Releasing Member-Integrated Transfer Sheet»

Hereinbelow, the method for producing releasing member-integrated transfer sheet of various embodiments described above will be described by way of one example. The releasing member-integrated transfer sheet 300 of various embodiments described above is not limited to ones produced by the following method.

(Examples of Production Method Using Adhesive Layer)

(i) Dry Lamination Method

In a method for producing the releasing member-integrated transfer sheet 300 as an example using the adhesive layer 220, a transfer sheet 100 including a transfer layer 20 on one side of a second support 10 is provided. In the production method, subsequently, a coating liquid for adhesive layer is applied to the other side of the second support 10 and dried to form an adhesive layer 220, and then, the adhesive layer 220 and a first support 210 constituting the releasing member 200 are attached to each other by compression bonding. Alternatively, the coating liquid for adhesive layer may be applied to the first support 210 and dried to form the adhesive layer 220. Alternatively, after the first support 210 and the second support 10 are attached to each other via the adhesive layer 220, the transfer layer may be formed on one side of the second support 10. The same applies to a wet lamination method described below.

(ii) Wet Lamination Method

In a method for producing the releasing member-integrated transfer sheet 300 as another example using the adhesive layer 220, a transfer sheet 100 including a transfer layer 20 on one side of a second support 10 is provided. In the production method, subsequently, a coating liquid for adhesive layer, which is for the releasing member 200 and finally forms into the adhesive layer 220, is applied to the other side of the second support 10, and the coating liquid for adhesive layer applied to the other side of the second support 10 and a first support 210 constituting the releasing member 200 are attached to each other by compression bonding while the coating liquid for adhesive layer is in a wet condition.

(Examples of Production Method Using Melt-Extruded Resin Layer)

(i) Sand Lamination Method

In a method for producing the releasing member-integrated transfer sheet 300 as an example using a melt-extruded resin layer, a transfer sheet including a transfer layer 20 on one side of a second support 10 is provided. In the production method, subsequently, a melted resin is extruded between the second support 10 constituting the transfer sheet 100 and a first support 210 constituting a releasing member 200, in other words, a melted resin is poured between the first support 210 and the second support 10, and thus, the first support 210 and the second support 10 are attached to each other via a melt-extruded resin layer thus formed.

(ii) Tandem Lamination Method

In a method for producing the releasing member-integrated transfer sheet 300 as another example using a melt-extruded resin layer, a melted resin is extruded onto a first support 210 to thereby form a melt-extruded resin layer. In the production method, subsequently, a transfer sheet including a transfer layer 20 on one side of a second support 10 is provided on the melt-extruded resin layer formed on the first support 210, and thus, the first support 210 and the second support 10 are attached to each other via the melt-extruded resin layer. In the production method, instead of forming a melt-extruded resin layer on the first support 210, a melt-extruded resin layer may be formed on the second support 10, and then the first support 210 may be provided on this melt-extruded resin layer.

In the production method exemplified above, the second support 10 before the transfer layer 20 is provided and the first support may be attached via the melt-extruded resin layer, and then, the transfer layer 20 may be provided on the second support 10.

«Method for Producing a Print»

Next, a method for producing a print according to an embodiment of the present disclosure (hereinbelow, it may be referred to as a method for producing a print of one embodiment) will be described with reference to FIG. 6. When the adhesive layer 220 is replaced by a melt-extruded resin layer, the reference to the adhesive layer 220 should be appropriately read as a melt-extruded resin layer.

Figure 6B:
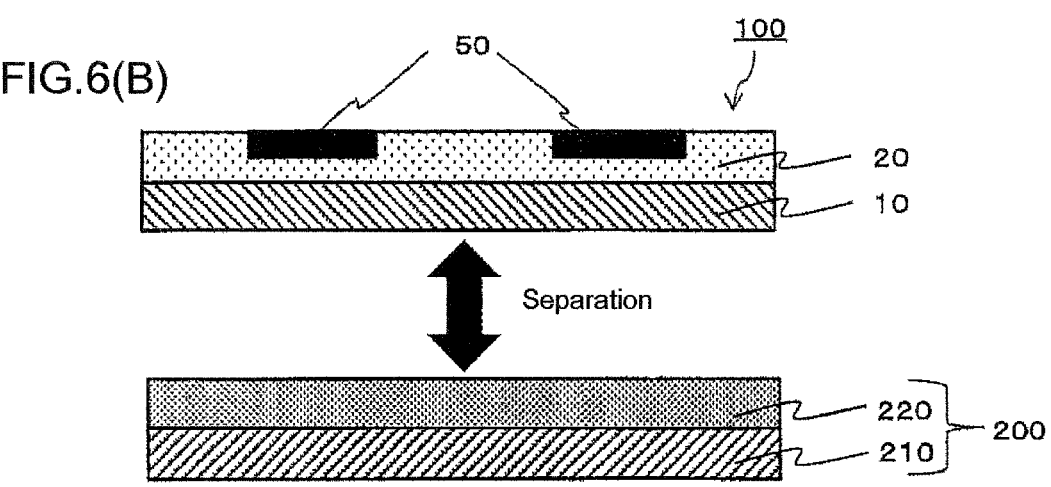
Figure 6C:
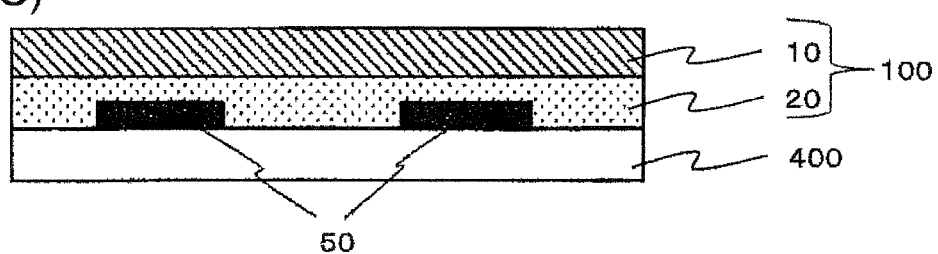

The method for producing a print of one embodiment comprises a step of forming an image 50 on a transfer layer 20 of a releasing member-integrated transfer sheet 300, as shown in FIG. 6(A), a step of separating a transfer sheet 100 including the transfer layer 20 on which the image 50 has been formed from a releasing member 200, as shown in FIG. 6(B), and a step of combining the transfer sheet 100 separated from the releasing member 200 with a transfer receiving article 400 to transfer the transfer layer 20 onto the transfer receiving article 400, as shown in FIGS. 6(C) and (D).

According to the method for producing a print of one embodiment having the features described above, the image 50 can be formed on the transfer layer 20 while occurrence of printing wrinkles and printing unevenness is prevented, and also the transfer layer 20 on which the image 50 has been formed can be transferred onto the transfer receiving article 400 while occurrence of irregular transfer is prevented.

(Step of Forming Image)

This step is a step of forming the image 50 on the transfer layer 20 of the releasing member-integrated transfer sheet 300, as shown in FIG. 6(A). As the releasing member-integrated transfer sheet 300 for use in the method for producing a print of one embodiment, the releasing member-integrated transfer sheet 300 of various embodiments described above can be used as it is, and thus, a detailed description thereof is omitted here. The releasing member-integrated transfer sheet of the embodiment shown in FIG. 1 is employed as the releasing member-integrated transfer sheet 300 in FIG. 6, but the releasing member-integrated transfer sheet is not limited to the releasing member-integrated transfer sheet 300 of this embodiment.

The step of forming an image is performed by setting the releasing member-integrated transfer sheet 300 in a printer and conveying the releasing member-integrated transfer sheet 300 along the conveyance path of the printer. Here, in the method for producing a print of one embodiment, the releasing member-integrated transfer sheet 300 having a releasing member 200 of the various embodiments described above is employed. When assuming that the thickness of the second support 10 is identical, the bulk-increase in the total thickness by the thickness of the releasing member can be provided in comparison with a conventional transfer sheet not having the releasing member 200 (e.g., the comparative transfer sheet 100X described above). As described above, occurrence of printing wrinkles and printing unevenness on forming the image 50 has a close relevance to the conveyability of the transfer sheet, and the conveyability can be enhanced by increasing the thickness of the transfer sheet. In this regard, according to the method for producing a print of one embodiment employing the releasing member-integrated transfer sheet 300 of the various embodiments described above, the conveyability of the releasing member-integrated transfer sheet 300 can be enhanced in the printer, and as a result, occurrence of printing wrinkles and printing unevenness can be prevented on forming the image 50 on the transfer layer 20. That is, the image printability can be improved.

There is no particular limitation on the image formation method, and the method may be appropriately determined depending on the image formation method possessed by the printer. As the image formation method, conventionally known image formation methods, such as a sublimation type thermal transfer method, fusion type thermal transfer method, inkjet printing method, and the like may be enumerated. The sublimation type thermal transfer method is an image formation method in which, by using the releasing member-integrated transfer sheet 300 and a transfer sheet having a colorant layer containing a sublimable dye in combination, energy is applied to the back side of the transfer sheet having the colorant layer to transfer the sublimable dye contained in the colorant layer to the transfer layer 20 to thereby form an image. The fusion type thermal transfer method is an image formation method in which, by using the releasing member-integrated transfer sheet 300 and a transfer sheet having a colorant layer containing a fusible ink in combination, energy in accordance with image information is applied to the back side of the transfer sheet having the colorant layer to transfer the entire colorant layer that has melted or softened by application of the energy onto the transfer layer 20. The inkjet printing method is an image formation method in which inkjet ink is allowed to adhere on the transfer layer 20 by injecting the ink from a nozzle by a pressure wave generated by piezo driving or by injecting the ink by generating bubbles in the ink in a tube by heating to thereby form an image.

(Separating Step)

This step is a step of separating the transfer sheet 100 having the transfer layer 20 on which the image 50 has been formed from the releasing member 200, as shown in FIG. 6(B). As described above, in the releasing member-integrated transfer sheet 300 for use in the method for producing a print of one embodiment, the adhesive force between the second support 10 and the adhesive layer 220 is smaller than the adhesive force between the first support 210 and the adhesive layer 220. Thus, the transfer sheet 100 is separable from the releasing member 200.

(Step of Transferring Transfer Layer)

Figure 6D:
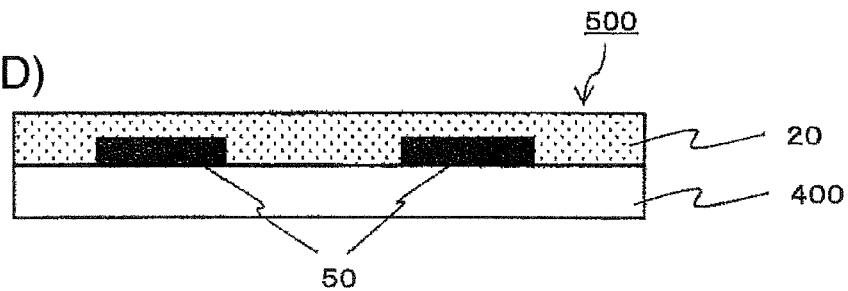

This step is a step of superposing the transfer sheet 100 separated from the releasing member 200 on the transfer receiving article 400 such that the transfer layer 20 on which the image 50 has been formed is opposed to the transfer receiving article and transferring the transfer layer 20 onto the transfer receiving article 400, as shown in FIG. 6(C). Through this step, obtained is a print 500 formed by transferring the transfer layer 20 on which the image 50 has been formed onto the transfer receiving article 400, as shown in FIG. 6(D).

In the method for producing a print of one embodiment, the step of separating the transfer sheet 100 from the releasing member 200 is performed before the transfer layer 20 is transferred. Thus, it is possible to make the thickness of the constituent members located on the second support 10 side of the transfer layer 20 smaller than the thickness before the separation. Thus, according to the method for producing a print of one embodiment, the transfer layer 20 can be easily transferred onto the transfer receiving article 400. For example, in the case of applying energy to the transfer sheet 100 to transfer the transfer layer 20, the energy applied to the second support 10 side can be efficiently transferred to the transfer layer 20, and as a result, the transferability of the transfer layer 20 can be enhance. In other words, irregular transfer can be prevented on transferring transfer layer 20 onto the transfer receiving article 400.

Transfer of the transfer layer 20 onto the transfer receiving article 400 may be performed by the thermal transfer method, in which energy is applied to the transfer sheet 100, or by a conventionally known various method other than this. As the thermal transfer method, a method using a heating device such as a thermal head, a hot stamp method, a heat roll method, and the like may be enumerated. As the transfer method other than those described above, various transfer methods, such as a pad transfer method, a press transfer method, an in-mold transfer method, a TOM (Three dimension Overlay Method) molding transfer method, a hydraulic transfer method, and a pressure sensitive method may be enumerated.

«Method for Producing Transfer Sheet»

Next, a method for producing a transfer sheet according to an embodiment of the present disclosure (hereinbelow, it may be referred to as a method for producing a transfer sheet of one embodiment) will be described. When the adhesive layer 220 is replaced by a melt-extruded resin layer, the reference to the adhesive layer 220 should be appropriately read as a melt-extruded resin layer.

The method for producing a transfer sheet of one embodiment comprises a step of forming an image 50 on a transfer layer 20 of a releasing member-integrated transfer sheet 300 and a step of separating a transfer sheet 100 including the transfer layer 20 on which the image 50 has been formed from a releasing member 200 (see FIGS. 6(A) and (B)).

According to the method for producing a transfer sheet of one embodiment, the transfer sheet 100 in which an image has been formed on the transfer layer 20 with good image printability can be produced. By use of the transfer sheet 100 produced, the transfer layer 20 on which the image has been formed can be transferred onto the transfer receiving article 400 with good transferability.

The method for producing a transfer sheet of one embodiment differs from the above method for producing a print of one embodiment described above in that the former method does not comprise a step of transferring the transfer layer 20 of the transfer sheet 100 onto the transfer receiving article 400.

The method for producing a transfer sheet of one embodiment may comprise a winding step of winding the transfer sheet 100 separated from the releasing member 200. According to the method for producing a transfer sheet of one embodiment further comprising this step, a transfer sheet 100 wound in a roll form can be produced. The method for producing a transfer sheet of one embodiment may comprise a winding step of winding the releasing member 200 separated from the transfer sheet 100.

«Print System»

Next, a print system according to an embodiment of the present disclosure (hereinbelow, it may be referred to as a print system of one embodiment) will be described.

The print system of one embodiment is a print system to be used in combination with the releasing member-integrated transfer sheet 300 of the various embodiments described above, comprising an image formation device that forms an image on a transfer layer 20 of the releasing member-integrated transfer sheet 300, a separation device that separates a transfer sheet 100 from a releasing member 200, and a transfer device that transfers the transfer layer 20 of the transfer sheet 100 separated onto a transfer receiving article 400.

According to the print system of one embodiment having the above characteristics, an image can be formed on the transfer layer 20 of the releasing member-integrated transfer sheet 300 with good image printability, and the transfer layer 20 of the transfer sheet 100 separated from the releasing member 200 can be transferred onto the transfer receiving article 400 with good transferability. Accordingly, a print of a high quality can be produced.

FIG. 9 is a partial schematic view showing one example of a print system 600 of one embodiment, comprising a printer 610 equipped with an image formation device, and a separation device 620. The illustration for the transfer device is omitted.

Figure 9A:
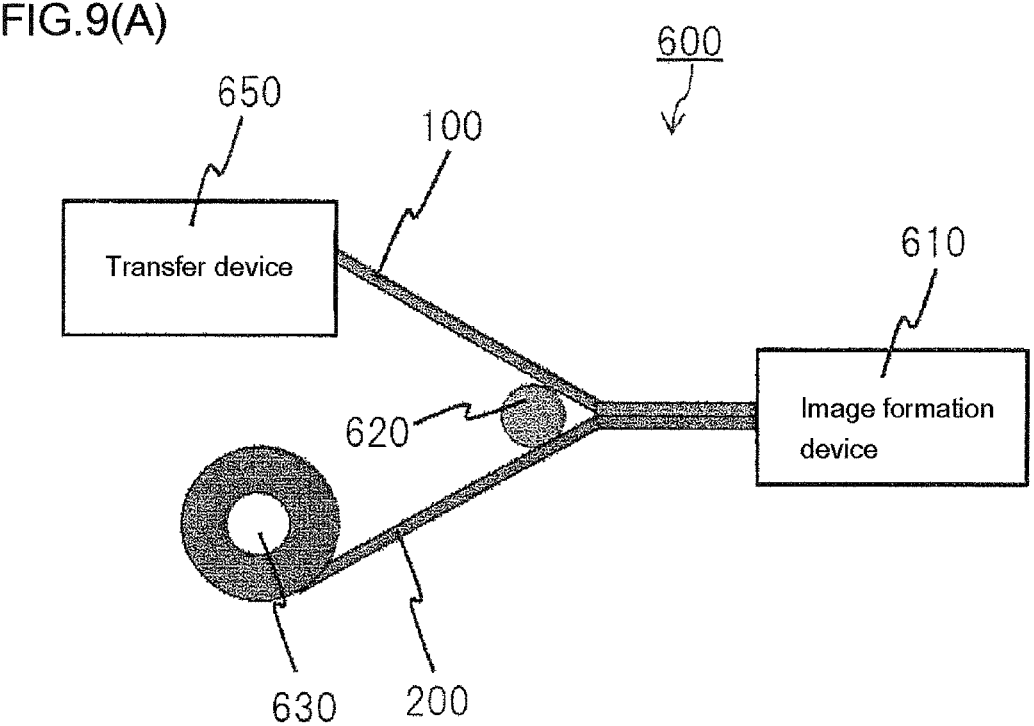
FIGS. 9(A) and (B) are schematic structural views each showing an example of a print system of one embodiment.

In the print system 600 of the embodiment shown in FIG. 9, the printer 610 equipped with an image formation device can form an image on the transfer layer 20 of the releasing member-integrated transfer sheet 300, and then, the separation device 620 can separate the releasing member-integrated transfer sheet 300 into the releasing member 200 and the transfer sheet 100. The print system 600 of the embodiment shown in FIG. 9(A) further comprises a winding roller 630 that winds the releasing member 200 separated in a roll form. The winding roller 630 is an optional constituent in the print system of one embodiment. The transfer layer 20 of the transfer sheet 100 separated is transferred onto a transfer receiving article by a transfer device 650 included in the print system 600 of one embodiment. The print system of one embodiment can be suitably used for the method for producing a print of the various embodiments described above.

As the image formation device that forms an image on the transfer layer 20, a heating device such as a thermal head may be enumerated.

As the separation device 620, a physical separation device may be used, or a chemical separation device may be used. As the physical separation device, a device employing a peeling roller and a device that pinches the end of either one or both of the releasing member 200 and the transfer sheet 100 with a holding member (not shown) to drive the holding member may be enumerated. The peeling roller or the holding member constitute the separation device 620. As the chemical separation device, a device that applies thermal energy or emits active beam energy in combination with an adhesive layer 220 of which adhesiveness is lowered by application of thermal energy or irradiation of active beam energy, as the adhesive layer 220 constituting the releasing member 200, may be enumerated. This case is under the condition that the adhesive force between the second support 10 and the adhesive layer 220 is smaller than the adhesive force between the first support 210 and the adhesive layer 220 even after the adhesiveness of the adhesive layer 220 is lowered. An energy application device or an active beam energy emitting device constitutes the separation device 620.

There is no particular limitation on the transfer device that transfers the transfer layer 20 of the transfer sheet 100 separated onto the transfer receiving article 400, and a device that can achieve various transfer methods described above may be appropriately selected and used.

In the embodiment shown in FIG. 9(A), the separation device 620 is separately independent of the printer 610 equipped with an image formation device, but the separation device 620 may be provided in the printer 610. The same applies to the transfer device 650, and the transfer device may be provided in the printer or may be separately independent of the printer.

Figure 9B:
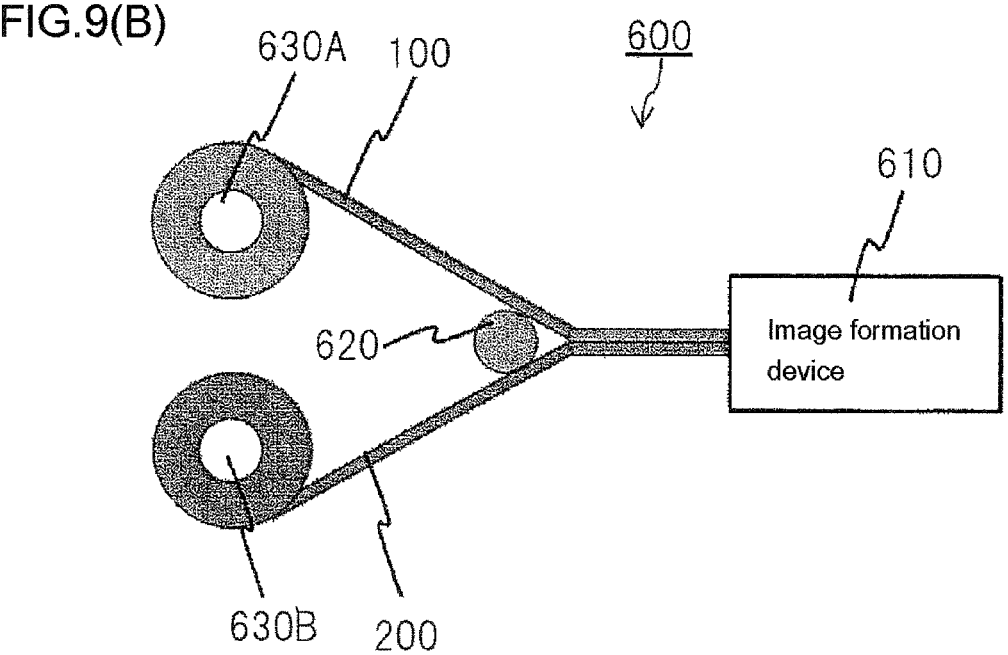

The print system according to another embodiment comprises an image formation device that forms an image on the transfer layer 20 of the releasing member-integrated transfer sheet 300 and a separation device that separates the transfer sheet 100 from the releasing member 200, as shown in FIG. 9(B). The print system according to another embodiment may further comprise a winding device that winds either one or both of the transfer sheet 100 separated by the separation device and the releasing member 200, as shown in FIG. 9(B) (the embodiment shown includes a transfer sheet winding device 630A that winds the transfer sheet 100 separated and a releasing member winding device 630B that winds the releasing member 200 separated.). The print system according to another embodiment can be suitably used for the method for producing the transfer sheet 100 of one embodiment described above.

EXAMPLES

Next, the present invention will be described more concretely with reference to examples and comparative examples. Hereinbelow, unless otherwise specified, the expression of part(s) or % means that by mass, being a value not in terms of solid content.

Example 1

As a first support, a polyethylene terephthalate film having a thickness of 125 μm (VOID PET K1212, TOYOBO CO., LTD.) was used. A coating liquid for adhesive layer having the following composition was applied to the first support so as to obtain a thickness of 10 μm in the dried state, and then the coated liquid was dried to obtain a releasing member (1) including an adhesive layer provided on the first support. Additionally, as a substrate for second support, a polyethylene terephthalate film having a thickness of 12 μm (transparent PETE-5100, TOYOBO CO., LTD.) was used. A coating liquid for release layer having the following composition was applied to the other side of the substrate for second support so as to obtain a thickness of 0.5 μm in the dried state, and then the coated liquid was dried to form a release layer. Thus, formed was a second support constituted by the substrate for second support and the release layer. Subsequently, a coating liquid for receiving layer having the following composition was applied to one side of the substrate for second support so as to achieve a thickness of 2 μm in the dried state, and then the coated liquid was dried to form a transfer layer constituted by a receiving layer. Thus, obtained was a transfer sheet (1) including the transfer layer constituted by the receiving layer provided on the second support. Subsequently, the releasing member (1) and the transfer sheet (1) were attached to each other such that the adhesive layer was opposed to the release layer to thereby obtain a releasing member-integrated transfer sheet of Example 1 including the releasing member (1) and the transfer sheet (1) integrated.

<Coating Liquid for Adhesive Layer>
  Acryl copolymer (solid content 40%) (SK-Dyne 1310L, Soken Chemical & Engineering Co., Ltd.) 48 parts
  Epoxy resin (solid content 5%) 0.36 parts (curing agent, E-AX, Soken Chemical & Engineering Co., Ltd.)
  Ethyl acetate 51.64 parts
<Coating Liquid for Release Layer>
  Silicone release agent (solid content 31%) (KS-847H, Shin-Etsu Chemical Co., Ltd.) 20 parts
  Methyl ethyl ketone 40 parts
  Toluene 40 parts
<Coating Liquid for Receiving Layer>
  Vinyl chloride-vinyl acetate copolymer (SOLBIN® CNL, Nissin Chemical Co., Ltd.) 19 parts
  Organic modified silicone (X-22-3000T, Shin-Etsu Chemical Co., Ltd.) 1 part
  Methyl ethyl ketone 40 parts
  Toluene 40 parts

Example 2

A releasing member-integrated transfer sheet of Example 2 including the releasing member (1) and the transfer sheet (2) integrated was prepared in the same manner as in Example 1, except for replacing the substrate for second support by a polyethylene terephthalate film having a thickness of 38 μm (transparent PETE-5100, TOYOBO CO., LTD.) to form the transfer sheet (2).

Example 3

A releasing member-integrated transfer sheet of Example 3 including the releasing member (2) and the transfer sheet (2) integrated was prepared in the same manner as in Example 1, except for replacing the first support by a polyethylene terephthalate film having a thickness of 188 μm (K2323, TOYOBO CO., LTD.) to form the releasing member (2) and replacing the substrate for second support by a polyethylene terephthalate film having a thickness of 38 μm (transparent PETE-5100, TOYOBO CO., LTD.) to form the transfer sheet (2).

Example 4

A releasing member-integrated transfer sheet of Example 4 including the releasing member (2) and the transfer sheet (3) integrated was prepared in the same manner as in Example 1, except for replacing the first support by a polyethylene terephthalate film having a thickness of 188 μm (VOID PET K2323, TOYOBO CO., LTD.) to form the releasing member (2) and replacing the substrate for second support by a polyethylene terephthalate film having a thickness of 75 μm (transparent PETE-5100, TOYOBO CO., LTD.) to form the transfer sheet (3).

Example 5

A releasing member-integrated transfer sheet of Example 5 including the releasing member (3) and the transfer sheet (2) integrated was prepared in the same manner as in Example 1, except for replacing the first support by a coated paper sheet having a thickness of 154 μm to form the releasing member (3) and replacing the substrate for second support by a polyethylene terephthalate film having a thickness of 38 μm (transparent PETE-5100, TOYOBO CO., LTD.) to form the transfer sheet (2).

Example 6

A releasing member-integrated transfer sheet of Example 6 including the releasing member (4) and the transfer sheet (2) integrated was prepared in the same manner as in Example 1, except for replacing the first support by a polyethylene terephthalate film having a thickness of 125 μm (transparent PETE-5100, TOYOBO CO., LTD.) to form the releasing member (4) and replacing the substrate for second support by a polyethylene terephthalate film having a thickness of 38 μm (transparent PETE-5100, TOYOBO CO., LTD.) to form the transfer sheet (2).

Example 7

As a first support, a polyethylene terephthalate film having a thickness of 188 μm (K2323, TOYOBO CO., LTD.) was used. A coating liquid for adhesive layer having the above composition was applied to the first support so as to obtain a thickness of 10 μm in the dried state, and then the coated liquid was dried to obtain a releasing member (2) including an adhesive layer provided on the first support. Additionally, as a substrate for second support, a polyethylene terephthalate film having a thickness of 38 μm (transparent PETE-5100, TOYOBO CO., LTD.) was used. A coating liquid for release layer having the above composition was applied to the other side of the substrate for second support so as to obtain a thickness of 0.5 μm in the dried state, and then the coated liquid was dried to form a release layer. Thus, formed was a second support constituted by the substrate for second support and the release layer. Subsequently, a coating liquid for peeling layer having the following composition was applied to one side of the substrate for second support so as to achieve a thickness of 1 μm in the dried state, and then the coated liquid was dried to form a transfer layer constituted by a peeling layer. Thus, obtained was a transfer sheet (4) including the transfer layer constituted by the peeling layer provided on the second support. Subsequently, the releasing member (2) and the transfer sheet (4) was attached to each other such that the adhesive layer was opposed to the release layer to thereby obtain a releasing member-integrated transfer sheet of Example 7 including the releasing member (2) and the transfer sheet (4) integrated.

(Coating Liquid for Peeling Layer)
  Acrylic resin (DIANAL® BR-87, Mitsubishi Chemical Corporation) 20 parts
  Toluene 40 parts
  Methyl ethyl ketone 40 parts Example 8

Figure 10:
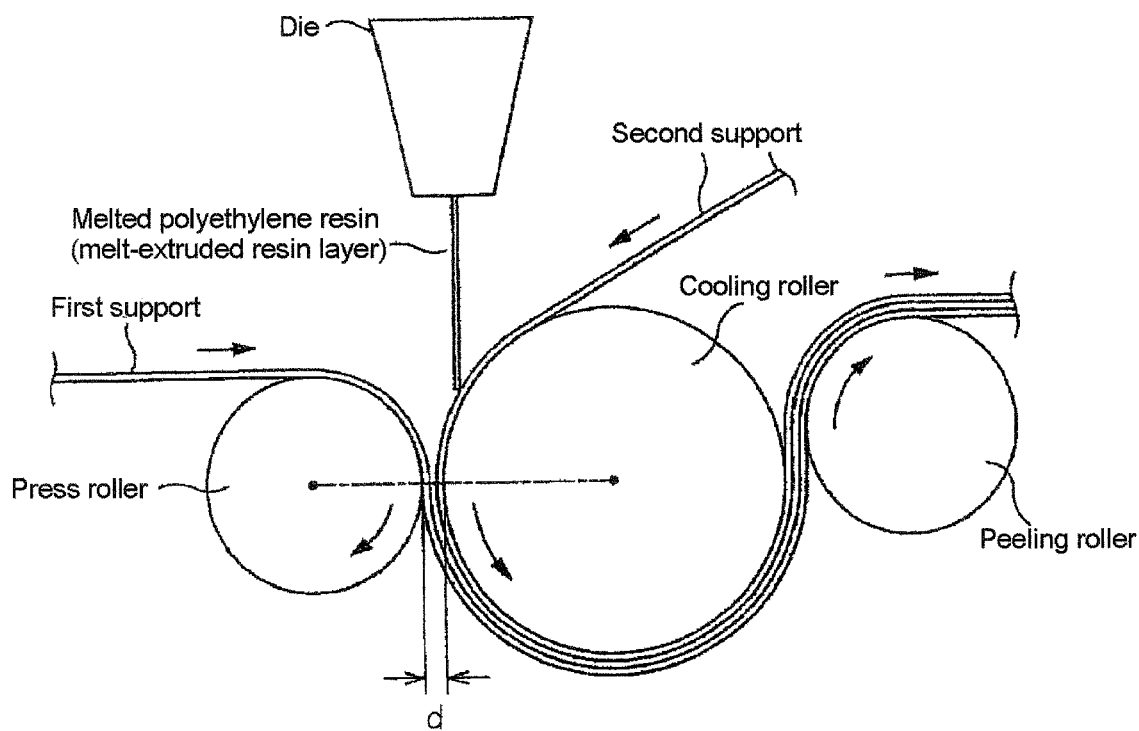
FIG. 10 is a schematic structural view of a melt-extrusion apparatus.

As a first support, a polyethylene terephthalate film having a thickness of 125 μm (VOID PET K1212, TOYOBO CO., LTD.) was provided, and as a second support, a polyethylene terephthalate film having a thickness of 12 μm (transparent PETE-5100, TOYOBO CO., LTD.) was provided. A melt-extrusion apparatus having a pair of a press roller and a cooling roller and having a die located at a position 5 mm apart toward the side of the cooling roller from the position corresponding to the midpoint of the interval d (see FIG. 10) was used. The first support provided was positioned on the side of the press roller, and the second support was positioned on the side of the cooling roller. Next, while the first support and second support were allowed to pass between the pair of rollers, a melted polyethylene resin (melting point: 107° C., density: 0.919 g/cm³) was extruded between the first support and the second support to form a melt-extruded resin layer having a thickness of 15 μm. Peeling was performed using the peeling roller in the end to obtain a laminate including the first support and the second support attached to each other via the melt-extruded resin layer. Then, the coating liquid for receiving layer having the above composition was applied to the second support in the laminate obtained so as to obtain a thickness of 2 μm in the dried state, and then, the coated liquid was dried to form a transfer layer constituted by a receiving layer. Thus, obtained was a releasing member-integrated transfer sheet of Example 8 in which the releasing member including the melt-extruded resin layer provided on the first support was integrated with the transfer sheet including the receiving layer provided on the second support. The first support and the melt-extruded resin layer constitute the releasing member, and the second support and the receiving layer constitute the transfer sheet. The interval d was appropriately adjusted in consideration of the thickness of the first support and the second support.

Example 9

A releasing member-integrated transfer sheet of Example 9 was prepared in the same manner as in Example 8, except for replacing the second support by a polyethylene terephthalate film having a thickness of 38 μm (transparent PETE-5100, TOYOBO CO., LTD.).

Example 10

A releasing member-integrated transfer sheet of Example 10 was prepared in the same manner as in Example 8, except for replacing the first support by a polyethylene terephthalate film having a thickness of 188 μm (K2323, TOYOBO CO., LTD.) and replacing the second support by a polyethylene terephthalate film having a thickness of 38 μm (transparent PETE-5100, TOYOBO CO., LTD.).

Comparative Example 1

A transfer sheet of Comparative Example 1 constituted only by the transfer sheet (A) was prepared in the same manner as in Example 1, except for replacing the substrate for second support by a polyethylene terephthalate film having a thickness of 25 μm to form a transfer sheet (A) and not integrating the sheet (A) with a releasing member.

Comparative Example 2

A transfer sheet of Comparative Example 2 constituted only by the transfer sheet (B) was prepared in the same manner as in Example 1, except for replacing the substrate for second support by a polyethylene terephthalate film having a thickness of 75 μm (transparent PETE-5100, TOYOBO CO., LTD.) to form a transfer sheet (B) and not integrating the sheet (B) with a releasing member.

Comparative Example 3

A transfer sheet of Comparative Example 3 constituted only by the transfer sheet (C) was prepared in the same manner as in Example 1, except for replacing the substrate for second support by a polyethylene terephthalate film having a thickness of 188 μm (transparent PETE-5100, TOYOBO CO., LTD.) to form a transfer sheet (C) and not integrating the sheet (C) with a releasing member.

(Measurement of Stiffness)

The stiffness in the MD of the entire releasing member-integrated transfer sheet of each Example obtained above and the stiffness in the MD of the entire transfer sheet of each Comparative Example obtained above were measured by the Gurley method in accordance with JIS-L-1085 (1998). The measurement results are shown in Table 1.

(Measurement of Adhesive Force)

The adhesive force between the second support and the adhesive layer in the releasing member-integrated transfer sheet of each Example was measured using a DIGITAL FORCE GAUGEDS-20N (IMADA CO., LTD.) based on the method for measuring the adhesive force described above. The adhesive force between the second support and the adhesive layer in the releasing member-integrated transfer sheet of each of Examples 1 to 7 was 100 mN/cm, and the adhesive force between the second support and the melt-extruded resin layer in the releasing member-integrated transfer sheet of each of Examples 8 to 10 was 150 mN/cm.

(Preparation of Transfer Sheet for Image Formation)

As a substrate, a polyethylene terephthalate film having a thickness of 5 μm was used. A coating liquid for dye primer layer having the following composition was applied to a portion of one side of the substrate so as to obtain a thickness of 0.15 μm in the dried state, and then, the coated liquid was dried to form a dye primer layer. Onto this dye primer layer, coating liquids for yellow colorant layer, for magenta colorant layer, and cyan colorant layer each having the following composition were coated so as to be layered in parallel on the dye primer layer across the surface of the dye primer layer, as being frame sequentially and so as to obtain a thickness of 0.7 μm in the dried state, and the coated liquids were dried to form a yellow colorant layer, a magenta colorant layer, and a cyan colorant layer. Onto a region in which no dye primer layer was formed on the one side of the substrate, a coating liquid for fusible ink layer having the following composition was coated so as to obtain a thickness of 0.7 μm in the dried state, and then, the coated liquid was dried to form a fusible ink layer. A coating liquid for back face layer 1 having the following composition was applied to the other side of the substrate so as to obtain a thickness of 1 μm in the dried state, and then, the coated liquid was dried to form a back face layer to thereby obtain a transfer sheet for image formation.

(Coating Liquid for Back Face Layer)
- Polyvinyl butyral resin (S-LEC® BX-1, SEKISUI CHEMICAL CO., LTD.) 1.8 parts
- Polyisocyanate (BURNOCK® D750, DIC Corporation) 5.5 parts
- Phosphoric ester type surfactant (PLY SURF® A208N, manufactured by Dai-ichi Kogyo Seiyaku, Co., Ltd.) 1.6 parts
- Talc (MICRO ACE® P-3, Nippon Talc Co., Ltd.) 0.35 parts
- Toluene 18.5 parts
- Methyl ethyl ketone 18.5 parts <Coating Liquid for Dye Primer Layer>
- Colloidal alumina (solid content 10.5%) (Alumina sol 200, Nissan Chemical Industries, Ltd.) 3.5 parts
- Vinyl acetate-vinyl pyrrolidone copolymer (PVP/VAE-335, ISP Japan Ltd.) 1.5 parts
- Water 47.5 parts
- Isopropyl alcohol 47.5 parts <Coating Liquid for Yellow Colorant Layer>
- Solvent Yellow 93 2.5 parts
- Disperse Yellow 201 2.5 parts
- Polyvinyl acetoacetal resin (S-LEC® KS-5, SEKISUI CHEMICAL CO., LTD.) 4 parts
- Organic modified silicone oil 0.04 parts
- Toluene 50 parts
- Methyl ethyl ketone 50 parts <Coating Liquid for Magenta Colorant Layer>
- Disperse Red 60 3 parts
- Disperse Violet 26 3 parts
- Polyvinyl acetoacetal resin (S-LEC® KS-5, SEKISUI CHEMICAL CO., LTD.) 5 parts
- Organic modified silicone oil 0.05 parts
- Toluene 50 parts
- Methyl ethyl ketone 50 parts <Coating Liquid for Cyan Colorant Layer>
- Solvent Blue 63 3 parts
- Disperse Blue 354 4 parts
- Polyvinyl acetoacetal resin (S-LEC® KS-5, SEKISUI CHEMICAL CO., LTD.) 5 parts
- Organic modified silicone oil 0.05 parts
- Toluene 50 parts
- Methyl ethyl ketone 50 parts <Coating Liquid for Fusible Ink Layer>
- Carbon black 4 parts
- Vinyl chloride-vinyl acetate copolymer (SOLBIN® CNL, Nissin Chemical Co., Ltd.) 6 parts
- Toluene 50 parts
- Methyl ethyl ketone 50 parts (Conveyability Evaluation)

The releasing member-integrated transfer sheet of each Example obtained above and the transfer sheet of each Comparative example obtained above were each set in a sublimation type thermal transfer method printer (DS620, Dai Nippon Printing Co., Ltd.), and the conveyability of the releasing member-integrated transfer sheet of each Example and the transfer sheet of each Comparative Example in the printer were evaluated in accordance with the following evaluation criteria. The evaluation test results are also shown in table 1.

"Evaluation Criteria"
- A: Conveyable without problem.
- NG(1): Conveyable in some cases.
- NG(2): Cannot be conveyed.

(Image Printability Evaluation)

The releasing member-integrated transfer sheet of Example 1 obtained above and the transfer sheet for image formation obtained above were set in the following test printer, and a black image (image gray scale: 0/255) was formed on the receiving layer of the releasing member-integrated transfer sheet of Example 1 by using the yellow colorant layer, magenta colorant layer, and cyan colorant layer of the transfer sheet for image formation. Under the same conditions, a black image was formed on the releasing member-integrated transfer sheet of each of Examples 2 to 10 and on the receiving layer of the transfer sheet of each Comparative Example. In the case of releasing member-integrated transfer sheet of Example 7, the fusible ink layer of the transfer sheet for image formation was used, and this fusible ink layer was melt-transferred to form a black image (image gray scale: 0/255) on the peeling layer. Each black image formed was visually observed, and the image printability thereof was evaluated in accordance with the following evaluation criteria. The evaluation test results are also shown in table 1.

(Test Printer)
- Thermal head: KEE-57-12GAN2-STA (KYOCERA Corporation)
- Heating element average resistance: 3303 (Ω)
- Main scanning direction printing density: 300 (dpi)
- Sub scanning direction printing density: 300 (dpi)
- Printing voltage: 18 (V)
- Line cycle: 1.5 (msec./line)
- Printing start temperature: 35(° C.)
- Pulse Duty ratio: 85(%)

"Evaluation Criteria"
- A: No printing wrinkles and printing unevenness occur.
- B: Printing wrinkles or printing unevenness slightly occurs.
- NG(1): Printing wrinkles or printing unevenness having a problem in use frequently occurs.
- NG(2): Printing fails.

(Transferability Evaluation for Transfer Layer)

In the releasing member-integrated transfer sheet of each Example on which the above image had been formed, the releasing member was separated from the transfer sheet and used as the transfer sheet of each Example. Next, the transfer layer of the transfer sheet of each Example was transferred onto a polyvinyl chloride card (PVC card) (Dai Nippon Printing Co., Ltd.) as a transfer receiving article by using a heat roller, and the transferability of the transfer layer was evaluated in accordance with the following evaluation criteria. Under the same conditions, the transferability of the transfer layer of the transfer sheet of each Comparative Example was evaluated. The evaluation test results are also shown in table 1.

"Evaluation Criteria"

A: It was possible to transfer the transfer layer without problems under conditions of 160° C. and 22 mm/sec.

B: It was possible to transfer the transfer layer without problems under conditions of 180° C. and 22 mm/sec., but it was not possible to satisfactorily transfer the transfer layer under conditions of 160° C. and 22 mm/sec.

NG: It was not possible to transfer the transfer layer even under conditions of 200° C. and 22 mm/sec.

(Evaluation for Winding Property of Releasing Member)

In the releasing member-integrated transfer sheet of each Example, the releasing member separated from the transfer sheet was wound by a simple winder (Dai Nippon Printing Co., Ltd.), and the winding property was evaluated in accordance with the following evaluation criteria. The evaluation test results are also shown in table 1.

"Evaluation Criteria"

A: Finely woundable without meandering and deflection

B: With considerable meandering and deflection, but woundable

TABLE 1

| | Structure of releasing member | Structure of transfer sheet (from releasing member side) | Structure of second support (from releasing member side) | Conveyability | Image printability | Transferability | MD stiffness [mN] | Winding property |
|---|---|---|---|---|---|---|---|---|
| Example 1 | First support/ adhesive layer | Second support/ receiving layer | Release layer/PET | A | B | A | 3.1 | B |
| Example 2 | First support/ adhesive layer | Second support/ receiving layer | Release layer/PET | A | A | A | 8.3 | B |
| Example 3 | First support/ adhesive layer | Second support/ receiving layer | Release layer/PET | A | A | A | 16.7 | B |
| Example 4 | First support/ adhesive layer | Second support/ receiving layer | Release layer/PET | A | B | B | 25.5 | B |
| Example 5 | First support/ adhesive layer | Second support/ receiving layer | Release layer/PET | A | A | A | 14.7 | B |
| Example 6 | First support/ adhesive layer | Second support/ receiving layer | Release layer/PET | A | A | A | 12.8 | B |
| Example 7 | First support/ adhesive layer | Second support/ peeling layer | Release layer/PET | A | A | A | 16.7 | B |
| Example 8 | First support/ melt-extruded resin layer | Second support/ receiving layer | PET | A | B | A | 4.2 | A |
| Example 9 | First support/ melt-extruded resin layer | Second support/ receiving layer | PET | A | A | A | 8.8 | A |
| Example 10 | First support/ melt-extruded resin layer | Second support/ receiving layer | PET | A | A | A | 16.9 | A |
| Comparative Example 1 | — | Second support/ receiving layer | Release layer/PET | NG (2) | NG (2) | A | Unmeasurable | — |
| Comparative Example 2 | — | Second support/ receiving layer | Release layer/PET | NG (1) | NG (1) | B | 1.2 | — |
| Comparative Example 3 | — | Second support/ receiving layer | Release layer/PET | A | A | NG | 12.3 | — |

*PET in the table means a polyethylene terephthalate film

REFERENCE SIGNS LIST

100 Transfer sheet
10 Second support
11 Substrate
12 Release layer
20 Transfer layer
20A Receiving layer
20B peeling layer
200 Releasing member
210 First support
220 Adhesive layer
300 Releasing member-integrated transfer sheet
400 Transfer receiving article
500 Print
600 Print system
610 Printer
620 Separation device (peeling roller)

The invention claimed is:

1. A releasing member-integrated transfer sheet comprising:
a releasing member comprising a first support; and
a transfer sheet comprising a transfer layer comprising an image forming layer provided on a second support,
wherein the transfer layer comprises an image forming layer,
wherein the transfer layer is peelable from the second support,
wherein the first support is separated from the second support via at least one resin layer,
wherein an adhesive force between the second support and the resin layer is smaller than an adhesive force between the first support and the resin layer so that the transfer sheet is separable from the releasing member, and
wherein one or both of a stiffness of the releasing member-integrated transfer sheet in a machine direction (MD) and that in a traverse direction (TD) are in a range of 5 mN or more to 25 mN or less, as measured by the Gurley method in accordance with JIS-L-1085 (1998).

2. A releasing member-integrated transfer sheet comprising:
- a releasing member comprising
  - a first support, and
  - a peeling layer, comprising a resin layer, provided on the first support via a primer layer; and
- a transfer sheet comprising
  - a second support, and
  - a transfer layer, comprising a receiving layer, provided on the second support via a protective layer,
- wherein the transfer sheet is integrated with respect to the releasing member so that the peeling layer is opposed to the second support,
- wherein the transfer layer is peelable from the second support,
- wherein an adhesive force between the second support and peeling layer is smaller than an adhesive force between the first support and the peeling layer so that the transfer sheet is separable from the releasing member, and
- wherein one or both of a stiffness of the releasing member-integrated transfer sheet in a machine direction (MD) and that in a traverse direction (TD) are in a range of 5 mN or more to 25 mN or less, as measured by the Gurley method in accordance with JIS-L-1085 (1998).

3. The releasing member-integrated transfer sheet according to claim 2, wherein the resin layer has a thickness in a range of 2.5 µm or more and 50 µm.

4. The releasing member-integrated transfer sheet according to claim 2, wherein the receiving layer of the transfer layer comprises an image forming layer.

5. The releasing member-integrated transfer sheet according to claim 2, wherein the resin layer defining the peeling layer comprises at least one polyolefin resin.

* * * * *